(No Model.) 3 Sheets—Sheet 1.
W. M. McDOUGALL.
MOTOR FOR RAILWAY CARS.
No. 387,726. Patented Aug. 14, 1888.
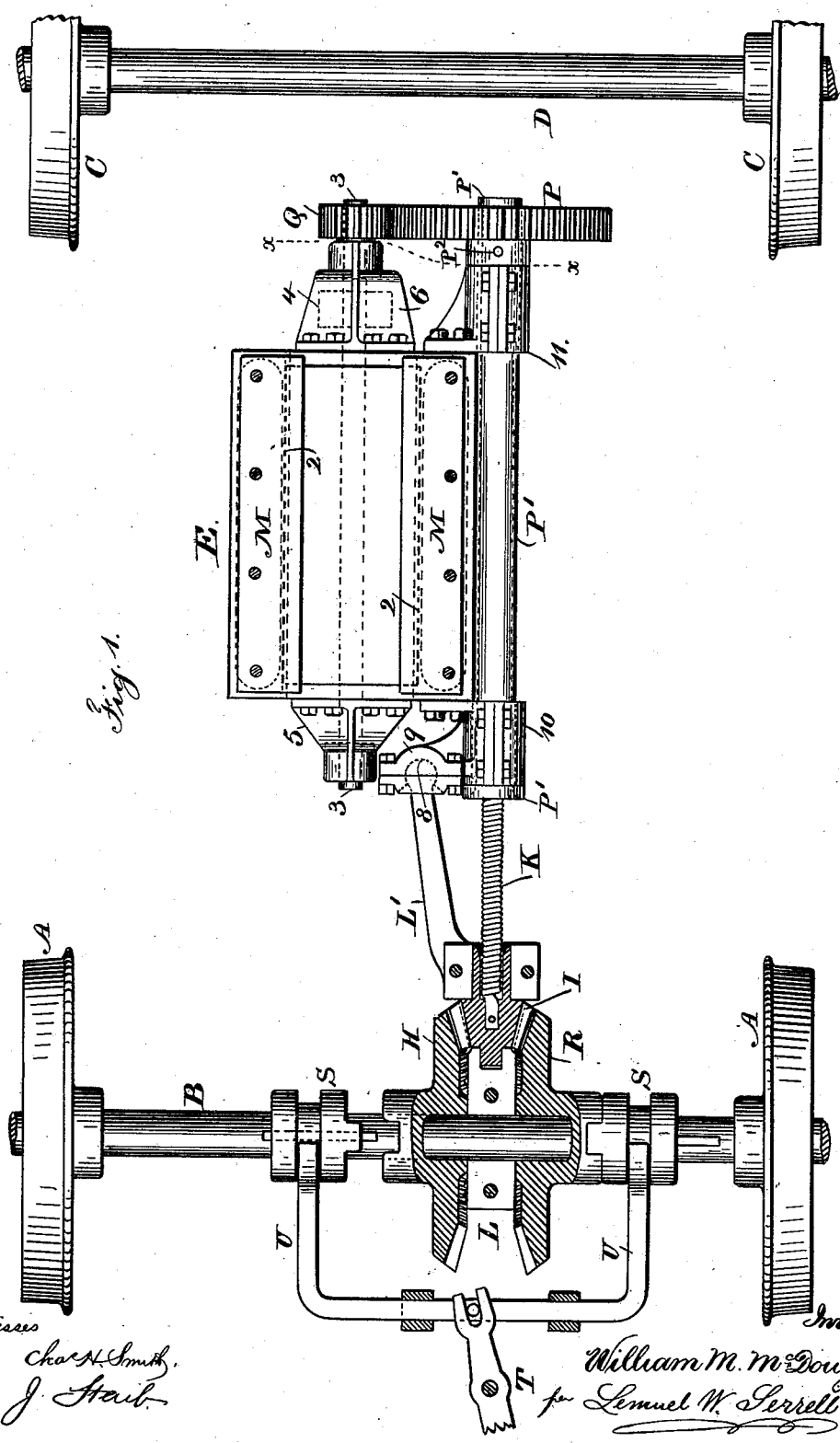
Witnesses
Chas H. Smith
J. Staib
Inventor
William M. McDougall
pr Lemuel W. Serrell
att.

(No Model.) 3 Sheets—Sheet 2.
W. M. McDOUGALL.
MOTOR FOR RAILWAY CARS.
No. 387,726. Patented Aug. 14, 1888.
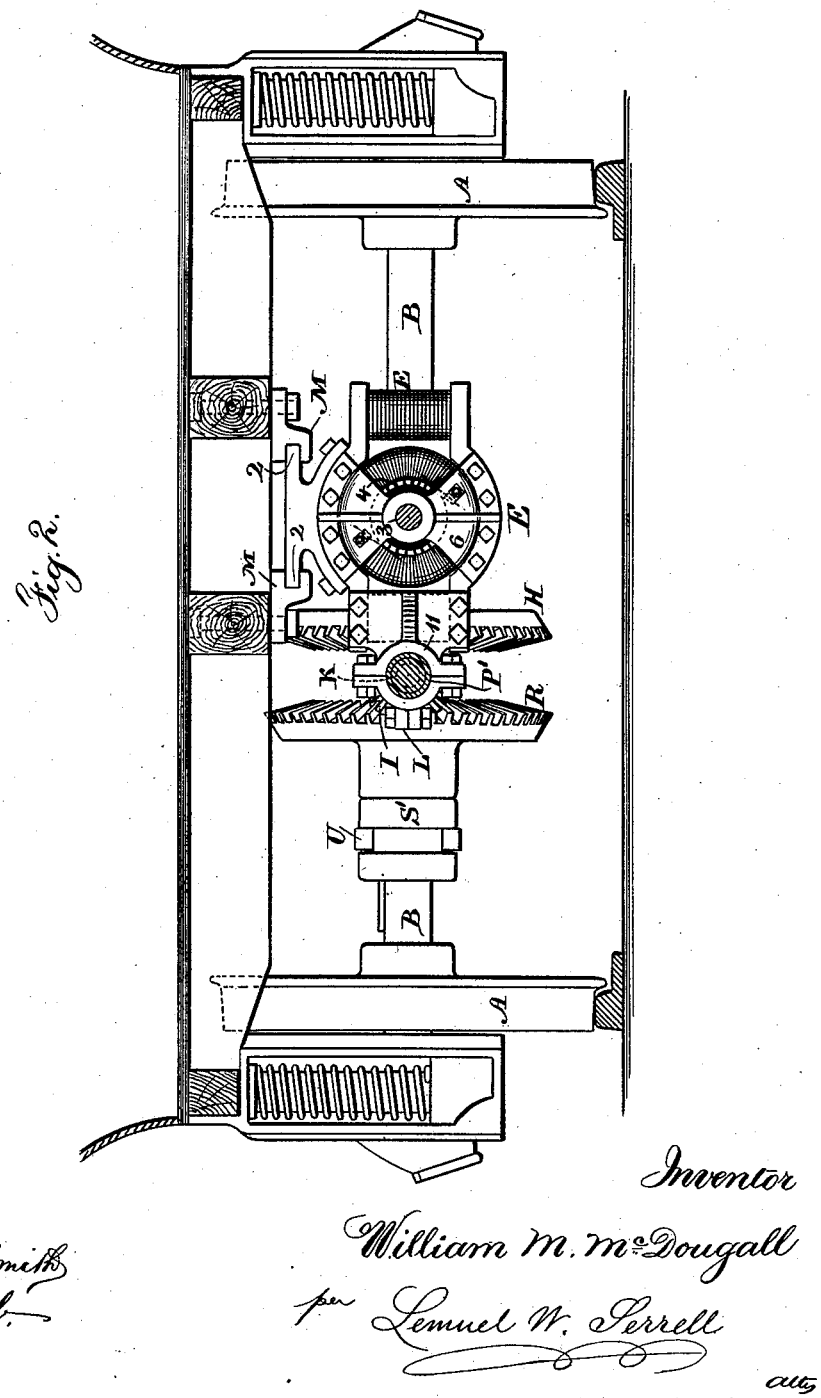
Witnesses
Chas. H. Smith
J. Staib
Inventor
William M. McDougall
per Lemuel W. Serrell
atty (No Model.) 3 Sheets—Sheet 3.
W. M. McDOUGALL.
MOTOR FOR RAILWAY CARS.
No. 387,726. Patented Aug. 14, 1888.
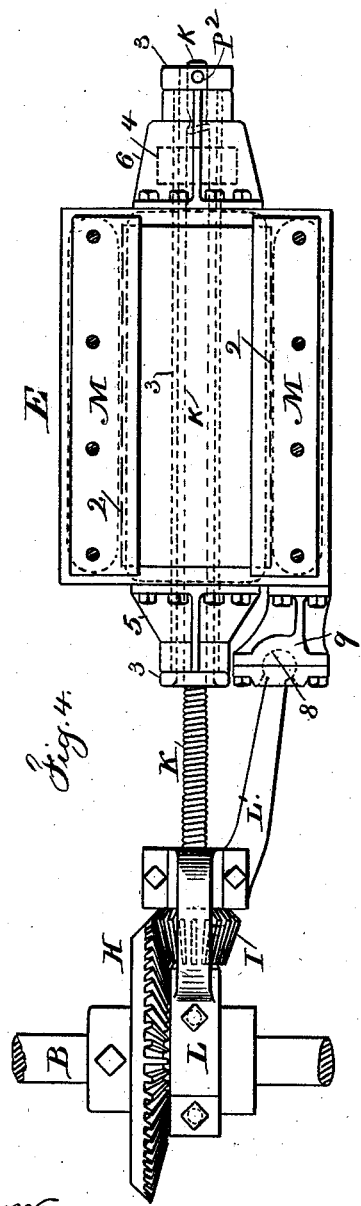
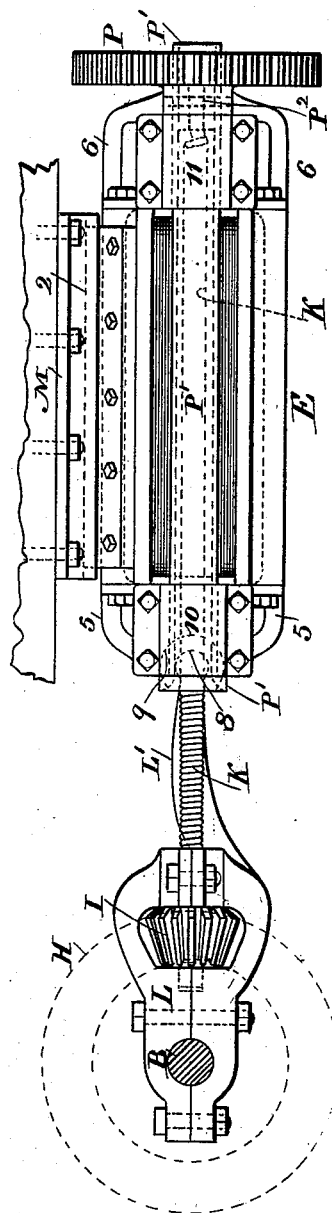
Witnesses.
Chas. H. Smith.
J. Staib.
Inventor,
William M. McDougall,
for Lemuel W. Serrell,
atty

United States Patent Office.

WILLIAM M. McDOUGALL, OF EAST ORANGE, NEW JERSEY.

MOTOR FOR RAILWAY-CARS.

SPECIFICATION forming part of Letters Patent No. 387,726, dated August 14, 1888.

Application filed February 13, 1888. Serial No. 263,853. (No model.)

*To all whom it may concern:*

Be it known that I, WILLIAM M. McDOUGALL, of East Orange, in the county of Essex and State of New Jersey, have invented an Improvement in Electric Motors for Railway-Cars, of which the following is a specification.

Electric motors revolving at a rapid rate are not adapted to driving railway-cars except by reducing the rate of revolution.

My present invention is adapted to the connection of the electric motor with the axle of the street-railway car in a simple and efficient manner, so that the car-body may rise and fall upon the axle and carry with it the electric motor, which is fastened to the under side of the platform, and the reducing-gearing is so constructed and mounted that the parts are not strained by the change of the relative position, and the connection is made very direct and simple.

In the drawings, Figure 1 is a plan view, partially in section, representing the motor and the connections to the axle of the car-wheel. Fig. 2 is a cross-section near the line $x\,x$, Fig. 1. Fig. 3 is an elevation of the motor, and Fig. 4 is a plan view of a single connection adapted to rotating the car-wheels in one direction only, or to a motor capable of revolving in either one direction or the other.

The wheels A are upon the axle B, and usually there is a second pair of wheels, C, with their axle D. The electric motor E is of any desired character. The one shown serves to illustrate such an electric motor as is adapted to the present purposes, there being flanges 2, by which the motor is connected with the under side of the car, and the armature shaft 3, commutator 4, and end frames, 5 6.

On the axle B is a bevel gear-wheel, H, and the bevel-pinion I gears with the same. This bevel-pinion I is upon a flexible shaft, K, that is connected with the armature-shaft 3 of the electric motor. Around the axle B is a journal box or bearing, L, from one side of which the frame L' extends to the frame of the electric motor E, and terminates as a ball, 8, within the socket 9, so that this ball and socket make a permanent connection between the frame L' and the frame of the electric motor, and the car can rise and fall upon the springs and in relation to the axle B without the connection between the frame L' and the electric motor E becoming bent or injured in consequence of this ball-and-socket joint; but it is usually preferable to support the flanges of the electric motor in slideways M upon the under side of the car, so that the same may have a slight endwise movement as the frame L' describes the arc of a circle during the rise or fall of the car-body. Upon this frame L' are the bearings for the shaft K of the bevel-pinion I, so that such pinion remains in gear with the wheel H at all times.

In Fig. 4 I have shown the shaft K as connected directly with the armature-shaft 3, so that the pinion I revolves by a direct connection to such armature-shaft; but in Figs. 1, 2, and 3 I have shown the flexible shaft K as extending to the far end of the electric motor and provided with a gear-wheel, P, into which the pinion Q on the armature shaft 3 gears, thereby reducing the speed of the pinion I, wheel H, and axle B in relation to the speed of the electric motor, and this form usually will be preferable, as electric motors run to the best advantage at a high speed, and thereby sufficient power is obtained by reducing the speed of the axle relatively to the motor.

In all instances it is necessary to make the shaft K flexible because of the change of position of the motor to the gearing by the rise and fall of the car-body. I prefer to make this flexible shaft with a central steel-wire core surrounded by helices wound in alternate opposite directions, so that the entire shaft is flexible; but it is adapted to transmit motion without being injured by the twisting action. Flexible shafts of this kind are well known and in public use. One end of this flexible shaft is fastened to the shaft of the pinion I, preferably by making the shaft of the pinion tubular and prolonging the flexible shaft through such tubular shaft and fastening the flexible shaft to the tubular shaft of the pinion at the distant end from the electric motor, and in cases where the flexible shaft is directly connected to the armature-shaft, as in Fig. 4, the armature-shaft is preferably tubular for the flexible shaft to pass through the same and be attached to the back end of such armature-shaft.

In the form represented in Figs. 1, 2, and 3 it is preferable to employ a tubular shaft, P'. for the gear-wheel P, such shaft being supported in bearings or boxes 10 and 11 upon the frames of the electric motor, and the flexible shaft K passes through this tubular shaft and is fastened at the back end at P², thereby allowing sufficient length for the flexible shaft to allow for the relative movements of the parts, as before set forth.

It will be apparent that the frame L' and ball-and-socket joint and the gearing before described may be made use of if a universal joint is introduced between two parts of the rigid shaft, thereby forming a flexible shaft to connect the pinion I with the electric motor.

In Fig. 1 I have represented a second bevel gear-wheel, R, upon the axle B, and two sliding clutches, S S', upon feathers or keys upon the axle B, and a lever, T, and fork U for shifting the sliding clutches S S'. In this instance the bevel gear-wheels H and R will be loose upon the axle B, and the sliding clutches S S' will be used to connect one wheel or the other with the axle for rotating such axle in one direction or the other, or for disconnecting both bevel gear-wheels from the axle, so that such gear-wheels may continue to rotate while the car stands still.

I claim as my invention—

1. The combination, with the car wheels and axle and an electric motor supported by the car-body, of a bevel gear-wheel upon the car-axle, a pinion to drive the same, a frame supported at one end by a journal or bearing upon the car-axle and connected at the other end by a ball-and-socket joint to the frame of the electric motor, and a flexible shaft between the pinion and the electric motor, substantially as set forth.

2. The combination, with the car axle and wheels, of an electric motor having flanges at the upper part of the frame, slides attached to the under side of the car-body for supporting the flanges and motor, the bevel-gearing and a flexible shaft for connecting the armature of the motor and the axle of the car, and a frame having a journal box or bearing at one end for the car-axle and the ball-and-socket joint at the other end to connect the frame with the frame of the electric motor, substantially as set forth.

3. The combination, with an electric motor connected at the under side of a railway-car and the axle or wheels, of a bevel-wheel upon the axle, a pinion gearing with the same, a frame extending from the axle to the frame of the motor, and a connection that allows the parts to turn as the car rises and falls, a tubular shaft receiving motion from the revolution of the armature, and a flexible shaft passing into said tubular shaft and attached at one end to said pinion and at the other end to said tubular shaft, substantially as set forth.

Signed by me this 8th day of February, 1888.

WILLIAM M. McDOUGALL.

Witnesses:
GEO. T. PINCKNEY,
WILLIAM G. MOTT.